United States Patent
Durham et al.

(10) Patent No.: US 11,377,364 B2
(45) Date of Patent: Jul. 5, 2022

(54) PROCESS FOR PREPARING DOPED LITHIUM LANTHANUM ZIRCONIUM OXIDE

(71) Applicant: UCHICAGO ARGONNE, LLC, Chicago, IL (US)

(72) Inventors: Jessica L. Durham, Braidwood, IL (US); Albert L. Lipson, Oak Park, IL (US); Ozgenur Kahvecioglu, Naperville, IL (US)

(73) Assignee: UCHICAGO ARGONNE, LLC, Chicago, IL (US)

( * ) Notice: Subject to any disclaimer, the term of this patent is extended or adjusted under 35 U.S.C. 154(b) by 446 days.

(21) Appl. No.: 16/727,191

(22) Filed: Dec. 26, 2019

(65) Prior Publication Data

US 2021/0198117 A1 Jul. 1, 2021

(51) Int. Cl.
*C01G 25/00* (2006.01)
*C01G 25/02* (2006.01)
*H01M 10/0562* (2010.01)
*H01M 10/0525* (2010.01)

(52) U.S. Cl.
CPC ........ *C01G 25/02* (2013.01); *H01M 10/0525* (2013.01); *H01M 10/0562* (2013.01); *C01P 2002/70* (2013.01); *H01M 2300/0077* (2013.01)

(58) Field of Classification Search
CPC ... C01G 25/006; C01G 25/02; H01M 10/052; H01M 10/0525; C01P 2002/70; C01P 2002/72
See application file for complete search history.

(56) References Cited

U.S. PATENT DOCUMENTS

2018/0248223 A1 8/2018 Kim et al.
2020/0131643 A1* 4/2020 Chan .................... C23C 28/042

OTHER PUBLICATIONS

Cao, S. et al., Modeling, Preparation, and Elemental Doping of Li7La3Zr2O12 Garnet-Type Solid Electrolytes: A Review, Journal of the Korean Ceramic Society 56 (2), 111-129 (2019).
Kim, D. et al., Fabrication and Electrochemical Characteristics of NCM-Based All-Solid Lithium Batteries Using Nano-Grade Garnet Al—LLZO Powder, Journal of Industrial and Engineering Chemistry 71, 445-451 (2019).
(Continued)

*Primary Examiner* — Cynthia H Kelly
*Assistant Examiner* — Monique M Wills
(74) *Attorney, Agent, or Firm* — Olson & Cepuritis, Ltd.

(57) ABSTRACT

A process for preparing doped-lithium lanthanum zirconium oxide (doped-LLZO) is described herein. The method involves dry doping of a co-precipitated lanthanum zirconium oxide (LZO) precursor. Dry doping is a process in which a dry powdered dopant is ground and mixed with a pre-prepared co-precipitated LZO precursor and a lithium salt to provide a LLZO precursor composition, which is subsequently calcined to form a doped-LLZO. The process described herein comprises calcining a dry, powdered (e.g., micron, sub-micron or nano-powdered) mixture of a co-precipitated LZO precursor, a dopant salt or oxide, and a lithium salt under an oxygen-containing atmosphere at a temperature in the range of about 500 to about 1100° C., and recovering the doped-LLZO after calcining.

22 Claims, 3 Drawing Sheets

(56) References Cited

OTHER PUBLICATIONS

Kun, R. et al., Structural and Computational Assessment of the Influence of Wet-Chemical Post-Processing of the Al-Substituted Cubic Li7La3Zr2O12, ACS Applied Materials & Interfaces 10, 37188-37197 (2018).

Miara, L. et al., First-Principles Studies on Cation Dopants And Electrolyte/Cathode Interphases For Lithium Garnets, Chemistry of Materials, 1-21 (2015).

Ramakumar, S. et al, Lithium Garnets: Synthesis, Structure, Li+ Conductivity, Li+ Dynamics and Applications, Progress in Materials Science 88, 325-411 (2017).

Shao, C. et al., Structure and Ionic Conductivity of Cubic Li7La3Zr2O12 Solid Electrolyte Prepared By Chemical Co-Precipitation Method, Solid State Ionics 287, 13-16 (2016).

Yang, S. E. et al., Ionic Conductivity of Ga-Doped LLZO Prepared Using Couette-Taylor Reactor For All-Solid Lithium Batteries, Journal of Industrial and Engineering Chemistry 56, 422-427 (2017).

* cited by examiner

PROCESS FOR PREPARING DOPED LITHIUM LANTHANUM ZIRCONIUM OXIDE

STATEMENT OF GOVERNMENT INTEREST

The United States Government has rights in this invention pursuant to Contract No. DE-AC02-06CH11357 between the United States Government and UChicago Argonne, LLC representing Argonne National Laboratory.

FIELD OF THE INVENTION

This invention relates to a method for preparing doped lithium lanthanum zirconium oxide (LLZO). More particularly, this invention relates to a method for producing LLZO doped with a structurally stabilizing metal or metalloid element.

BACKGROUND OF THE INVENTION

Lithium lanthanum zirconium oxide materials, such as $Li_7La_3Zr_2O_{12}$ (LLZO) and doped forms of that composition (doped-LLZO), are useful as solid state electrolytes in lithium battery systems. Solid state lithium batteries have many potential advantages over traditional liquid-electrolyte battery systems, including, e.g., improved safety, longer cycle life, higher energy density, higher power density, and lower self-discharge rate. LLZO has garnered interest as a solid-state electrolyte; however, this material has two different crystal structures—a tetragonal phase and a cubic phase with differing lithium conduction properties. The cubic crystal phase of LLZO has significantly higher lithium conductivity than the tetragonal phase, however, it is also less stable and converts to the tetragonal phase at high temperature. Doped-LLZO includes metal or metalloid cations (e.g., $Al^{3+}$, $Ta^{5+}$, $Ga^{3+}$, $Nb^{4+}$, $Y^{3+}$, $Fe^{3+}$, $B^{3+}$, and $Sb^{5+}$) that replace some of the lithium, lanthanum, and/or zirconium in LLZO, or non-metal anions (e.g., $F^-$) which replace oxygen and stabilize the cubic crystal structure.

There are many known methods for preparing doped LLZO and non-lithiated LZO precursors of LLZO, including sol-gel processes, flame spray pyrolysis, electrospinning, co-precipitation, and atomic layer deposition. Among these methods, co-precipitation is attractive due to its scalability and the fact that the battery industry already has the infrastructure for the co-precipitation process. The co-precipitation process for making LLZO materials typically involves forming a LZO precursor by co-precipitation of lanthanum hydroxide ($La(OH)_3$), zirconium oxide ($ZrO_2$) and/or zirconium hydroxide ($Zr(OH)_4$), and a dopant oxide or hydroxide (if applicable) from an aqueous solution of lanthanum, zirconium and dopant salts to form an intimately mixed LZO precursor composition. The precursor composition is then mixed and ground with a lithium salt (e.g., lithium carbonate or lithium hydroxide) to form a fine powder (micron or submicron sized), and then calcined (also referred to as sintering) at high temperature (e.g., 450 to 1200° C.) to form the LLZO material. The co-precipitation conditions are selected to ensure that the lanthanum and zirconium (and dopant element, if present) of the LZO precursor are uniformly mixed at the atomic level, so that the resulting calcined product has a substantially pure LLZO crystal phase. While this process is relatively straight forward for simple LLZO (i.e., without including the dopant), application to doped-LLZO is hampered by a limited pool of dopant materials that can co-precipitate within the same set of conditions as the lanthanum and zirconium.

There is an ongoing need for alternative methods for preparing doped-LLZO. The methods described herein address this need.

SUMMARY OF THE INVENTION

A process for preparing doped-LLZO is described herein. The method involves dry doping of a co-precipitated lanthanum zirconium oxide (LZO) precursor. Dry doping is a process in which a dry, powdered dopant is ground and mixed with a pre-prepared co-precipitated LZO precursor and a lithium salt to provide a powdered LLZO precursor composition, which is subsequently calcined to form the doped-LLZO. The process described herein comprises calcining a dry, powdered (e.g., micron, sub-micron or nano-powdered) mixture of a co-precipitated lanthanum zirconium oxide (LZO) precursor, a dopant salt or oxide, and a lithium salt under an oxygen-containing atmosphere (e.g., air or oxygen) at a temperature in the range of about 500 to about 1100° C., and recovering the doped-LLZO. Optionally the doped-LLZO can be further ground after recovery.

The co-precipitated LZO precursor comprises a mixture of lanthanum hydroxide in combination with zirconium oxide and/or zirconium hydroxide, in which the La and Zr are present in a La:Zr elemental ratio of about 3:2, and the La and Zr are uniformly mixed at the atomic level. The lithium salt and the dopant salt or oxide are mixed with the LZO precursor in amounts selected to achieve a target Li:La:Zr:X ratio in the doped-LLZO, where X a dopant ion, e.g., a dopant metal or metalloid cation (e.g., $Al^{3+}$, $Ta^{5+}$, $Ga^{3+}$, $Nb^{4+}$, $Y^{3+}$, $Fe^{3+}$, $B^{3+}$, and $Sb^{5+}$) other than Li, La, and Zr cations, a dopant non-metal anion other than O (e.g., a halide such as F, BC, or a chalcogenide other than oxygen, such as $S^{2-}$), or a combination of two or more thereof. In the doped-LLZO, X cations replace a portion of Li, La, and/or Zr cations in the formula $Li_7La_3Zr_2O_{12}$, while X anions replace a portion of O anion in the formula $Li_7La_3Zr_2O_{12}$. Typically, a slight excess of the lithium salt is utilized (e.g., about 1 to 20 mole percent (mol %) excess).

In some embodiments, the method further comprises preparing the powdered mixture by combining, grinding and mixing the co-precipitated lanthanum zirconium oxide (LZO) precursor, the dopant, and the lithium salt prior to calcining the powered mixture.

In yet other embodiments, the method further comprises preparing the co-precipitated LZO precursor prior to the grinding and mixing. The LZO precursor is prepared by co-precipitating zirconium oxide and/or hydroxide with lanthanum hydroxide from an aqueous solution of La and Zr salts in the appropriate La:Zr elemental ratio, e.g., by adding NaOH as the precipitating agent and to control the pH.

In some embodiments of the methods described herein a single dopant is utilized, while in some other embodiments two or more dopant materials are utilized. The dopant is a salt or oxide of the dopant ion, X, and can be any metal, metalloid, or non-metal ion. In some embodiments the dopant ion is cation of a transition metal, a main group metal (i.e., Al, Ga, In, Tl, Sn, Pb, and Bi), a lanthanide, an actinide, an alkaline earth metal, and/or a metalloid element (i.e., B, Si, Ge, As, Sb, Te, and Po), an anion of a non-metal element (e.g., a halide or chalcogenide, such as F, Br, Cl, or S), or a combination of two or more of the foregoing.

The methods described herein provide many advantages over other methods of preparing doped-LLZO. For example, doping during co-precipitation, as in one known method, can significantly affect the co-precipitation reactions (e.g., the morphology and size of the precipitated particles), while co-precipitation of only the LZO precursor (without dopant) is more controlled and simpler to optimize (e.g., due to fewer variables involved and the ease of precipitating La and Zr under similar conditions). In addition, dopant content can vary from batch to batch when the dopant is included in the co-precipitation reactions. Because co-precipitation involves several different reactions occurring at the same time, small changes in the co-precipitation reaction kinetics or thermodynamics can occur due to slight differences in the ratios of the dopant, La, and Zr. This can lead to different ratios of La/Zr/dopant in the resulting precipitate. If more than one dopant element is included in the co-precipitation reaction, even more variability can occur due to the greater number of reactions occurring in the solution at the same time, which may all depend on the concentration of a single reactant (e.g., hydroxide ion). In the methods described herein, where the dopant is mixed with premade LZO precursor, the dopant content is easier to control, since the dopant and LZO precursor are mixed in defined amounts and the calcination reaction is less sensitive to small variations in the reactant stoichiometry than the co-precipitation reactions, and multiple dopants can be readily included in the calcination reaction and in the doped-LLZO product.

The following non-limiting embodiments are provided below to illustrate certain aspects and features of the methods described herein.

Embodiment 1 is a process for preparing a doped lithium lanthanum zirconium oxide (doped-LLZO) comprising the sequential steps of:

(a) calcining a dry, powdered mixture of a co-precipitated lanthanum zirconium oxide (LZO) precursor, a dopant, and a lithium salt under an oxygen-containing atmosphere at a temperature in the range of about 500 to about 1100° C.; and (b) recovering the doped-LLZO;

wherein the co-precipitated LZO precursor comprises a mixture of lanthanum hydroxide in combination with zirconium oxide and/or zirconium hydroxide, in which the La and Zr are present in a La:Zr elemental ratio of about 3:2, and the La and Zr are uniformly mixed at the atomic level; the dopant is a salt or oxide of a dopant ion, X, which can be a metal cation, a metalloid cation, a non-metal anion, or a combination to two or more thereof, wherein X is not a Li, La Zr or O ion, wherein X cations replace a portion of Li, La, and/or Zr in the formula $Li_7La_3Zr_2O_{12}$, and X anions replace a portion of O anion in the formula $Li_7La_3Zr_2O_{12}$; and the lithium salt and the dopant are mixed with the LZO precursor in amounts selected to achieve a target Li:La:Zr:X ratio in the doped-LLZO.

Embodiment 2 is the process of embodiment 1, wherein X comprises an ion selected from the group consisting of an alkaline earth metal cation, a transition metal cation, a lanthanide cation, an actinide cation, a main group metal cation, a metalloid cation, and a non-metal anion.

Embodiment 3 is the process of any one of embodiments 1 and 2, wherein X comprises at least one cation selected from the group consisting of $Al^{3+}$, $Ta^{5+}$, $Ga^{3+}$, $Nb^{4+}$, $Y^{3+}$, $Fe^{3+}$, $W^{6+}$, $Te^{6+}$, $Ba^{2+}$, $Ce^{4+}$, $Ti^{4+}$, $B^{3+}$, and $Sb^{5+}$.

Embodiment 4 is the process of any one of embodiments 1 to 3, wherein X comprises $Al^{3+}$.

Embodiment 5 is the process of any one of embodiments 1 to 4, wherein X replaces about 0.15 to about 45 mol % of the Li in the formula $Li_7La_3Zr_2O_{12}$ (i.e., 0.01 to about 3 of the seven Li cations in the formula).

Embodiment 6 is the process of embodiment 5, wherein X comprises at least one cation selected from the group consisting of $B^{3+}$, $Al^{3+}$, $In^{3+}$, $Si^{4+}$, $Sr^{2+}$, $Ge^{4+}$, $Ga^{3+}$, $Zn^{2+}$, $Fe^{3+}$ and $Be^{3+}$.

Embodiment 7 is the process of any one of embodiments 1 to 6, wherein X replaces about 0.3 to about 50 mol % of La in the formula $Li_7La_3Zr_2O_{12}$ (i.e., 0.01 to about 1.5 of the three La cations in the formula).

Embodiment 8 is the process of embodiment 7, wherein X comprises at least one cation selected from the group consisting of $Ca^{2+}$, $Sr^{2+}$, $Mg^{2+}$, $Rb^+$, $Ac^{3+}$, $Ag^{1+}$, and a lanthanide cation having a 3+ oxidation state.

Embodiment 9 is the process of any one of embodiments 1 to 8, wherein X replaces about 0.5 to about 50 mol % of Zr in the formula $Li_7La_3Zr_2O_{12}$ (i.e., 0.01 to about 1 of the two Zr cations in the formula).

Embodiment 10 is the process of embodiment 9, wherein X comprises at least one cation selected from the group consisting of $Sc^{3+}$, $Cr^{3+}$, Ni $Cu^{2+}$, $Cd^{2+}$, $Au^{3+}$, $In^{3+}$, $Tl^{3+}$, $Eu^{2+}$, a metal or metalloid cation having a 4+ oxidation state, and a metal or metalloid cation having a 5+ oxidation state.

Embodiment 11 is the process of any one of embodiments 1 to 10, wherein X replaces about 0.08 to 0.33 mol % of O in the formula $Li_7La_3Zr_2O_{12}$ (i.e., 0.01 to about 4 of the twelve O anions in the formula).

Embodiment 12 is the process of embodiment 11, wherein X comprises at least one anion selected from the group consisting of $F^-$, $Cl^-$, $Br^-$, a non-metal anion having a 1-oxidation state, and a non-metal anion having a 2-oxidation state.

Embodiment 13 is the process of any one of embodiments 1 to 12, wherein the lithium salt comprises lithium hydroxide, lithium carbonate, lithium acetate, lithium formate, lithium fluoride, lithium chloride, or a combination thereof.

Embodiment 14 is the process of any one of embodiments 1 to 13, wherein the lithium salt is present in an amount that provides up to a 20 mol % excess of Li beyond what is required for the target ratio of Li:La:Zr:X.

Embodiment 15 is the process of any one of embodiments 1 to 14, wherein the co-precipitated LZO precursor comprises $La(OH)_3$ and $ZrO_2$.

Embodiment 16 is the process of any one of embodiments 1 to 15, wherein the dopant comprises aluminum tris-acetylacetonate ($Al(acac)_3$).

Embodiment 17 is the process of any one of embodiments 1 to 16, wherein the dopant comprises an oxide of X.

Embodiment 18 is the process of any one of embodiments 1 to 17, wherein the dopant comprises a salt of X.

Embodiment 19 is the process of embodiment 18, wherein the salt of X comprises at least one anion selected from the group consisting of hydroxide, carbonate, an organic carboxylate, nitrate, sulfide, chloride and fluoride.

Embodiment 20 is the process of any one of embodiments 1 to 19, wherein X comprises two or more dopant element ions.

Embodiment 21 is the process of any one of embodiments 1 to 20, further comprising grinding and mixing together the co-precipitated LZO precursor, the dopant, and the lithium salt to form the dry powdered mixture, prior to step (a) in embodiment 1.

Embodiment 22 is the process of embodiment 21, further comprising preparing the co-precipitated LZO precursor prior to the grinding and mixing.

The methods described herein consist of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention. As used herein, the terms "method" and "process" are used synonymously.

DETAILED DESCRIPTION

Figure 1:
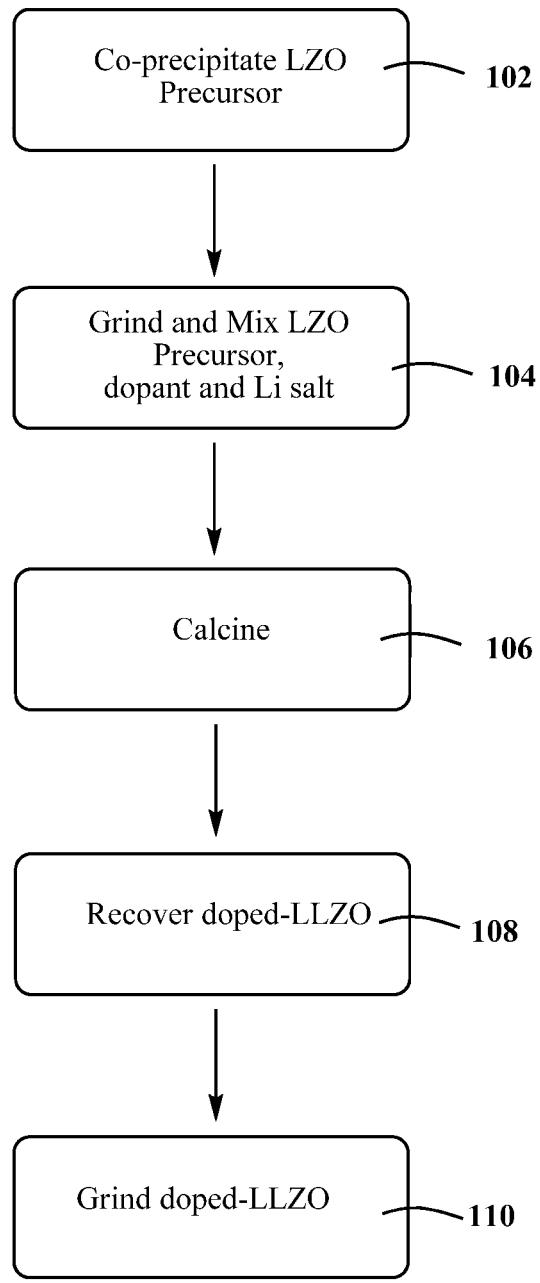
FIG. 1 provides flow diagram illustrating one embodiment of the methods described herein.

As described herein, dry doping of co-precipitated LZO precursor provides a new and effective process for preparing doped-LLZO. The methods described herein are versatile and robust, affording doped-LLZO with a highly uniform distribution of Li, La, Zr and dopant elements. These methods also allow incorporation of a wide variety of dopant species and even multiple dopant species.

In one embodiment, a process for preparing doped-LLZO comprises calcining a dry, powdered mixture of a co-precipitated LZO precursor, a dopant, and a lithium salt in an oxygen-containing atmosphere at a temperature in the range of about 500 to about 1100° C., and recovering the doped-LLZO; wherein the co-precipitated LZO precursor comprises a mixture of lanthanum hydroxide in combination with zirconium oxide and/or zirconium hydroxide, prepared by co-precipitation, in which the La and Zr are present in a La:Zr elemental ratio of about 3:2, and the La and Zr are uniformly mixed at the atomic level; the dopant is a salt or oxide of a dopant ion, X, and the lithium salt and the dopant are mixed with the LZO precursor in amounts selected to achieve a target Li:La:Zr:X ratio in the doped-LLZO.

The lithium salt can be any lithium salt that will decompose and become incorporated into the doped-LLZO during calcining. Typically, a sight excess of the lithium salt is utilized (e.g., 1 to 20 mol % excess, such as a 2 mol % excess, a 3 mol % excess, a 5 mol % excess, a 10 mol % excess, or a 15 mol % excess). The dopant salts are selected from the group consisting of hydroxides, carbonates, organic carboxylates (e.g., acetate, oxalate, acetylacetonate (acac), and the like), nitrates, sulfides, fluorides and chlorides.

Preferably, the LZO precursor is prepared by co-precipitation of lanthanum hydroxide ($La(OH)_3$) and zirconium oxide ($ZrO_2$) and/or zirconium hydroxide ($Zr(OH)_4$) from an aqueous solution of lanthanum and zirconium salts to form an intimately mixed LZO precursor composition.

In some embodiments, the method further comprises preparing the powdered mixture by combining, grinding and mixing the co-precipitated LZO precursor, the dopant, and the lithium salt prior to calcining the powered mixture. The grinding and mixing can be performed, e.g., in a high energy ball mill, a planetary ball mill, a fluidized bed jet mill, a hammer mill, rolling mill, automated mortar and pestle, micronizing mill, or any other such equipment for preparing dry powdered materials. In some preferred embodiments, the grinding and mixing is performed using a planetary ball mill.

In yet other embodiments, the method further comprises preparing the co-precipitated LZO precursor prior to the grinding and mixing. The LZO precursor is prepared by co-precipitating zirconium oxide and/or hydroxide with hydroxide from an aqueous solution of La and Zr salts in the appropriate La:Zr elemental ratio, e.g., by adding NaOH as the precipitating agent and to control the pH.

In some embodiments of the methods described herein a single dopant is utilized, while in some other embodiments two or more dopant materials are utilized. The dopant element/ion can comprise any metal, metalloid, or non-metal element. In some embodiments the dopant element comprises a transition metal, a main group metal, a lanthanide, an actinide, an alkaline earth metal, a metalloid, a non-metal, or a combination of two or more of the foregoing.

As described in S. Ramakumar et al. "Lithium garnets: synthesis, structure, $Li^+$ conductivity, $Li^+$ dynamics and applications, *Prog. Mat. Sci.* 2017, 88:325-411 ("Ramakumar") which is incorporated herein by reference in its entirety, different cations tend to preferentially replace either Li, La, or Zr in LLZO (see e.g., the annotated periodic table provided on page 385 of Ramakumar. For example, $B^{3+}$, $Al^{3+}$, $Ga^{3+}$, $Zn^{2+}$, $Fe^{3+}$ and $Be^{3+}$ tend to replace Li in $Li_7La_3Zr_2O_{12}$; $Ca^{2+}$, $Sr^{2+}$, $Ba^{2+}$, $Y^{2+}$, $Bi^{3+}$, $Ac^{3+}$, $Ag^{1+}$, and lanthanides having a 3+ oxidation state tend to replace La in $Li_7La_3Zr_2O_{12}$; and $Mg^{2+}$, $Sc^{3+}$, $Cr^{3+}$, $Ni^{2+}$, $Cu^{2+}$, $Cd^{2+}$, $Au^{3+}$, $In^{3+}$, $Tl^{3+}$, $Eu^{2+}$, metal or metalloid elements having a 4+ oxidation state, and metal or metalloid elements having a 5+ oxidation state tend to replace Zr in $Li_7La_3Zr_2O_{12}$. Anions such as $F^{1-}$, $Cl^{1-}$, and $S^{2-}$ can replace oxygen.

Methods for preparing co-precipitated LZO precursor have recently been examined in the literature, for example, as described in Ramakumar, referred to above, or in S. Cao et al., "Modeling, Preparation and Elemental Doping of $Li_7La_3Zr_2O_{12}$ Garnet-type Solid Electrolytes: A Review", J Korean Ceramic Soc., 2019, 56:111-129, which is incorporated herein by reference in its entirety. See also S. Yang, et al., "Ionic Conductivity of Ga-Doped LLZO Prepared Using Couette-Taylor Reactor for All-Solid Lithium Batteries", *J. Ind. Eng. Chem.*, 2017, 56:422-427; D. Kim, et al., "Fabrication and Electrochemical Characteristics of NCM-Based All-Solid Lithium Batteries Using Nano-Grade Garnet Al-LLZO Powder", *J. Ind. Eng. Chem.*, 2019, 71:445-451; H. Kim, et al., "Method for Preparing Solid Electrolyte for All-Solid-State Lithium Secondary Battery" U.S. Patent Publication No. US2018/0248223 Al (Aug. 30, 2018); C. Shao, et al., "Structure and Ionic Conductivity of Cubic $Li_7La_3Zr_2O_{12}$ Solid Electrolyte Prepared by Chemical Co-Precipitation Method", *Solid State Ionics*, 2016, 287:13-16; and R. Kun, et al., "Structural and Computational Assessment of the Influence of Wet-Chemical Processing of the Al-Substituted Cubic $Li_7La_3Zr_2O_{12}$", *ACS Appl. Mater. Interfaces*, 2018, 10:37188-37197; each of which is incorporated herein by reference.

Preferably, the LZO precursor is prepared by co-precipitation. The lanthanum and zirconium salts for co-precipitation preferably are selected from the group consisting of carbonates, nitrates, and sulfates. Additionally, ammonium hydroxide is typically used as a complexing agent while sodium hydroxide is present to control the pH and act as a precipitating agent. Once the LZO precursor is collected, it must be washed to remove salt-based by-products and dried to afford the final powdered form of the LZO precursor.

FIG. 1 provides a flow diagram illustrating one embodiment of the methods described herein. In FIG. 1, co-precipitated LZO is prepared at step 102. The co-precipitated LZO from step 102 is ground and mixed together with a lithium salt and a dopant at step 104 to form a dry, powdered mixture. The dry powdered mixture from step 104 is then calcined in step 106 at a temperature in the range of about 500 to 1100° C. in an oxygen-containing atmosphere (e.g., air, or $O_2$), e.g., for a period of time of about 1 hour to about 12 hours. Finally, the doped-LLZO is recovered in step 108. Optionally the doped LLZO can be further ground in Step 110.

The following non-limiting examples are provided to illustrate certain aspects and features of the methods described herein.

EXAMPLE 1

Co-precipitated LZO precursor was prepared by dissolving $La(NO_3)_3$ and $Zr(SO_4)_2$ salts in deionized water to produce an aqueous transition metal solution so that the molar ratio of La:Zr was about 3:2. Separate aqueous solutions containing $NH_4OH$ and NaOH were prepared. The molar concentration of a hydroxide solution:transition metal solution was about 2:1. The transition metal and $NH_4OH$ solutions were simultaneously fed into a Taylor vortex reactor by a pump set at a selected pumping rate, e.g., mL/min, to chelate with the transition metal ions, and achieve an approximate 4 hour residence time. Meanwhile, the sodium hydroxide was pumped to maintain a pH of 11 using a PID controller. The rotation speed of the Taylor vortex reactor was set to 800 RPM to mix the solutions and resulting precipitate within the reactor while the temperature of the reactor was set to 50° C. The LZO precursor slurry was collected from the overflow outlet of the reactor, washed with deionized water to remove salt-based by-products, and dried under vacuum.

Figure 2:
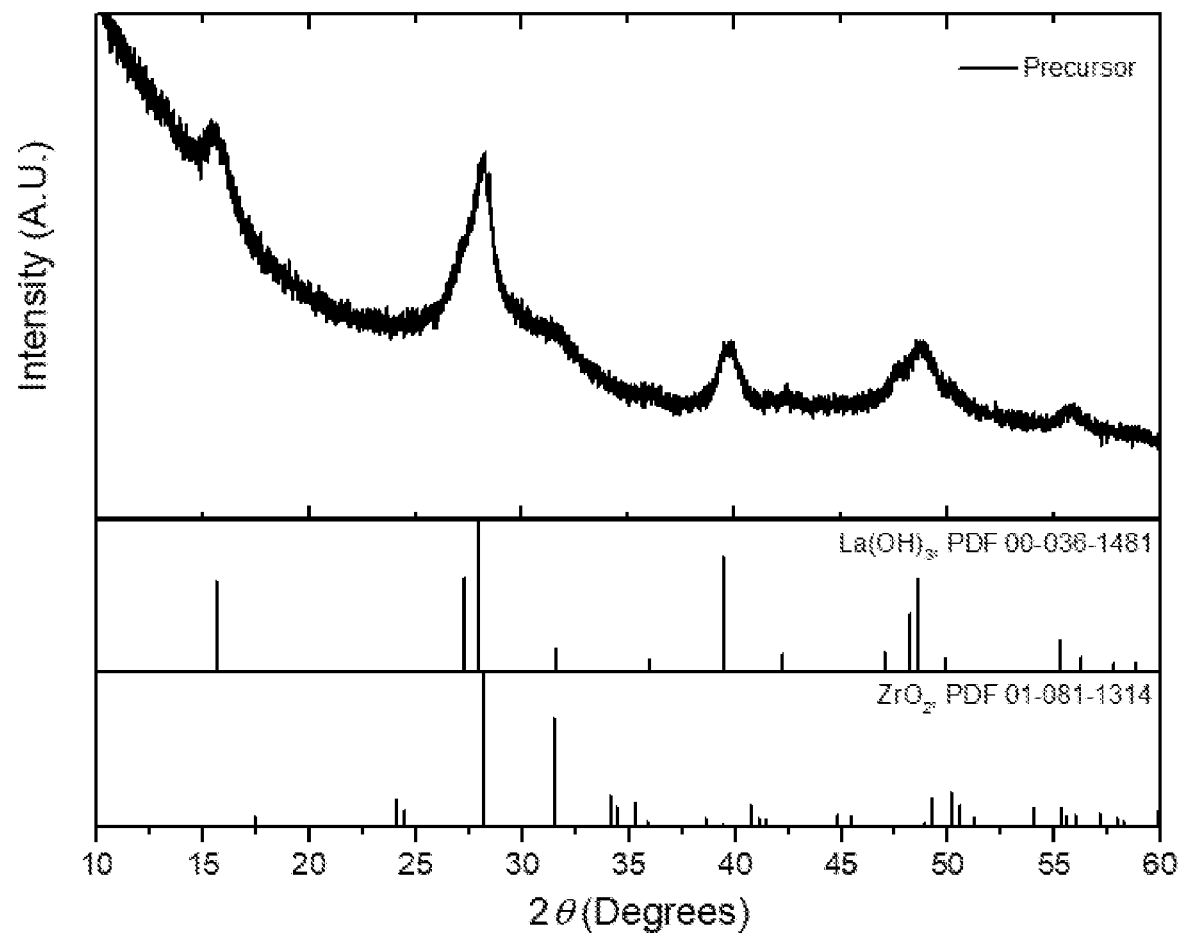
FIG. 2 provides an X-ray diffraction (XRD) pattern for co-precipitated LZO precursor, with reference patterns for $La(OH)_3$ and $ZrO_2$ components shown below the LZO precursor plot.

The co-precipitated LZO was examined by XRD. An XRD pattern of the LZO precursor is shown in FIG. 2, with the predicted peaks for the lanthanum hydroxide and zirconium oxide components shown below the XRD plot of the precursor. As is evident in FIG. 2, the actual spectrum agrees well with the predicted peak distribution. In addition, energy-dispersive X-ray spectroscopy (EDS) mapping was performed on the co-precipitated LZO precursor, which showed that La, Zr, and O were substantially uniformly spatially distributed in the LZO precursor material.

EXAMPLE 2

A dry powdered mixture of co-precipitated LZO precursor from Example 1, $Al(acac)_3$ as the dopant, and lithium hydroxide was prepared by grinding in a mortar and pestle.

EXAMPLE 3

A doped-LLZO of formula $Li_{0.25}La_3Zr_2Al_{0.25}O_{12}$ was prepared from the mixture of Example 2 by calcining at about 900° C. for about 6 hours under an atmosphere of flowing oxygen.

Figure 3:
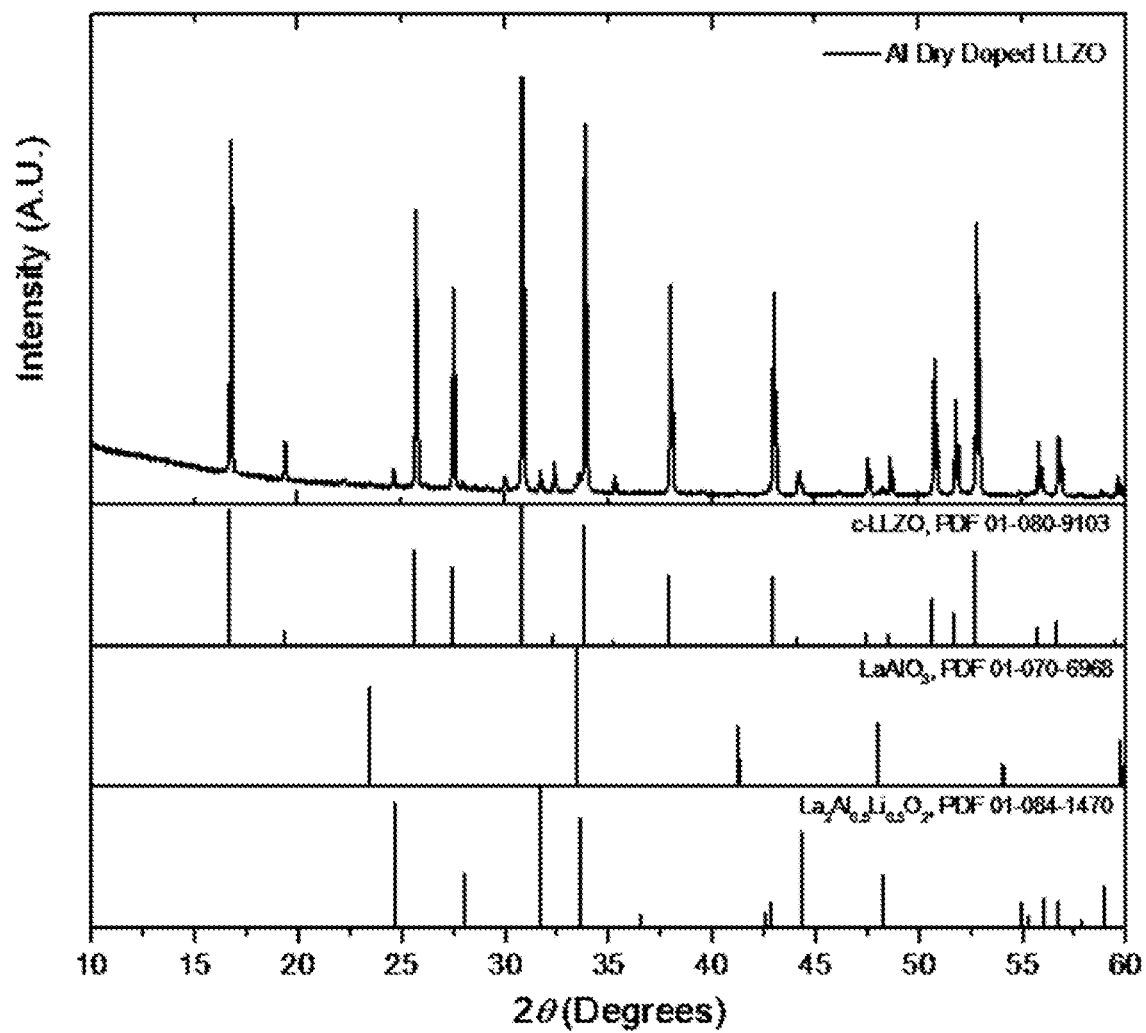
FIG. 3 provides an XRD pattern for an aluminum doped-LLZO ($Li_{6.25}La_3Zr_2Al_{0.25}O_{12}$) prepared by the method described herein, with reference peaks for the target cubic-LLZO phase as well as minor side product $LaAlO_3$ and $Li_{0.5}La_2Al_{0.5}O_2$ phases shown below the doped-LLZO plot.

The doped-LLZO of formula $Li_{0.25}La_3Zr_2Al_{0.25}O_{12}$ was examined by XRD. Based on the XRD pattern shown in FIG. 3, the peaks observed in the doped-LLZO agree well with the predicted peak distribution for cubic $Li_{0.25}La_3Zr_2Al_{0.25}O_{12}$, with minor impurities of side product $LaAlO_3$ and $Li_{0.5}La_2Al_{0.5}O_2$ phases (see the predicted peak distributions below the spectrum).

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The embodiments of the invention in which an exclusive property or privilege is claimed are defined as follows:

1. A process for preparing a doped lithium lanthanum zirconium oxide (doped-LLZO) comprising the sequential steps of:
   (a) calcining a dry, powdered mixture of a co-precipitated lanthanum zirconium oxide (LZO) precursor, a dopant, and a lithium salt in an oxygen-containing atmosphere at a temperature in the range of about 500 to about 1100° C.; and
   (b) recovering the doped-LLZO;
   wherein the co-precipitated LZO precursor comprises a mixture of lanthanum oxide and/or lanthanum hydroxide in combination with zirconium oxide and/or zirconium hydroxide, in which the La and Zr are present in a La:Zr elemental ratio of about 3:2, and the La and Zr are uniformly mixed at the atomic level; the dopant is a salt or oxide of a dopant ion, X, wherein X is not a Li, La Zr, or O ion, X cations replace a portion of Li, La, and/or Zr in the formula $Li_7La_3Zr_2O_{12}$, and X anions replace a portion of O anion in the formula $Li_7La_3Zr_2O_{12}$; and the lithium salt and the dopant are mixed with the LZO precursor in amounts selected to achieve a target Li:La:Zr:X ratio in the doped-LLZO.

2. The process of claim 1, wherein X comprises at least one ion selected from the group consisting of an alkaline earth metal cation, a transition metal cation, a lanthanide cation, an actinide cation, a main group metal cation, a metalloid cation, and a non-metal anion.

3. The process of claim 1, wherein the X comprises at least one cation selected from the group consisting of $Al^{3+}$, $Ta^{5+}$, $Ga^{3+}$, $Nb^{4+}$, $Y^{3+}$, $Fe^{3+}$, $W^{6+}$, $Te^{6+}$, $Ba^{2+}$, $Ce^{4+}$, $Ti^{4+}$, $B^{3+}$, and $Sb^{5+}$.

4. The process of claim 1, wherein X comprises $Al^{3+}$.

5. The process of claim 1, wherein X replaces about 0.15 to about 45 mole percent (mol %) of the Li in the formula $Li_7La_3Zr_2O_{12}$.

6. The process of claim 5, wherein X comprises at least one cation selected from the group consisting of $B^{3+}$, $Al^{3+}$, $In^{3+}$, $Si^{4+}$, $Sr^{2+}$, $Ge^{4+}$, $Ga^{3+}$, $Zn^{2+}$, $Fe^{3+}$ and $Be^{3+}$.

7. The process of claim 1, wherein X replaces about 0.3 to about 50 mol % of La in the formula $Li_7La_3Zr_2O_{12}$.

8. The process of claim 7, wherein X comprises at least one cation selected from $Ca^{2+}$, $Sr^{2+}$, $Mg^{2+}$, $Rb^+$, $Ba^{2+}$, $Y^{2+}$, $Bi^{3+}$, $Ac^{3+}$, $Ag^{1+}$, and a lanthanide cation having a 3+ oxidation state.

9. The process of claim 1, wherein X replaces about 0.5 to about 50 mol % of Zr in the formula $Li_7La_3Zr_2O_{12}$.

10. The process of claim 9, wherein X comprises at least one cation selected from the group consisting of $Sc^{3+}$, $Cr^{3+}$, $Ni^{2+}$, $Cu^{2+}$, $Cd^{2+}$, $Au^{3+}$, $In^{3+}$, $Tl^{3+}$, $Eu^{2+}$, a metal cation having a 4+ oxidation state, a metalloid cation having a 4+ oxidation state, a metal cation having a 5+ oxidation state, and metalloid cation having a 5+ oxidation state.

11. The process of claim 1, wherein X replaces about 0.8 to 33 mol % of O in the formula $Li_7La_3Zr_2O_{12}$.

12. The process of claim 11, wherein X is selected from the group consisting of $F^-$, $Cl^-$, $Br^-$, a non-metal anion having a 1-oxidation state, and a non-metal anion having a 2-oxidation state.

13. The process of claim 1, wherein the lithium salt comprises at least one salt selected from the group consisting of lithium hydroxide, lithium carbonate, lithium acetate, lithium sulfide, lithium fluoride, and lithium chloride.

14. The process of claim 13, wherein the lithium salt is present in an amount that provides up to a 20 mol % excess of Li beyond what is required for the target ratio of Li:La:Zr:X.

15. The process of claim 1, wherein the co-precipitated LZO precursor comprises $La(OH)_3$ and $ZrO_2$.

16. The process of claim 1, wherein the dopant comprises aluminum tris-acetylacetonate ($Al(acac)_3$).

17. The process of claim 1, wherein the dopant comprises an oxide of X.

18. The process of claim 1, wherein the dopant comprises a salt of X.

19. The process of claim 18, wherein the salt of X comprises at least one anion selected from the group consisting of hydroxide, carbonate, an organic carboxylate, nitrate, sulfide, fluoride, and chloride.

20. The process of claim 1, wherein X comprises two or more dopant ions.

21. The process of claim 1, further comprising grinding and mixing together the co-precipitated LZO precursor, the dopant, and the lithium salt to form the dry powdered mixture, prior to step (a).

22. The process of claim 21, further comprising preparing the co-precipitated LZO precursor prior to the grinding and mixing.

* * * * *

UNITED STATES PATENT AND TRADEMARK OFFICE
CERTIFICATE OF CORRECTION

| | |
|---|---|
| PATENT NO. | : 11,377,364 B2 |
| APPLICATION NO. | : 16/727191 |
| DATED | : July 5, 2022 |
| INVENTOR(S) | : Durham et al. |

It is certified that error appears in the above-identified patent and that said Letters Patent is hereby corrected as shown below:

In the Claims

Claim 8, Column 9, Line 16, after the word "from" insert -- the group consisting of --.

Signed and Sealed this
Thirteenth Day of September, 2022

Katherine Kelly Vidal
*Director of the United States Patent and Trademark Office*